United States Patent [19]

Lincoln et al.

[11] Patent Number: 5,768,275

[45] Date of Patent: Jun. 16, 1998

[54] CONTROLLER FOR ATM SEGMENTATION AND REASSEMBLY

[75] Inventors: Bradford C. Lincoln; Douglas M. Brady, both of Boulder; David R. Meyer, Lakewood; Warner B. Andrews, Jr., Boulder, all of Colo.

[73] Assignee: Brooktree Corporation, San Diego, Calif.

[21] Appl. No.: 633,955

[22] Filed: Apr. 15, 1996

Related U.S. Application Data

[63] Continuation of Ser. No. 299,068, Aug. 31, 1994, abandoned.

[51] Int. Cl.$^6$ .................................................. H04L 12/56
[52] U.S. Cl. ................................................. 370/419; 370/474
[58] Field of Search ................................. 370/60, 60.1, 61, 370/68, 79, 94.1, 94.2, 58.1, 58.2, 58.3, 395, 349, 400, 399, 409, 413–418, 474, 419

[56] References Cited

U.S. PATENT DOCUMENTS

| | | | |
|---|---|---|---|
| 4,890,280 | 12/1989 | Hirata | 370/60 |
| 4,947,388 | 8/1990 | Kuwahara et al. | 370/60 |
| 5,136,584 | 8/1992 | Hedlund | 370/60 |
| 5,214,639 | 5/1993 | Herion | 370/60 |
| 5,280,475 | 1/1994 | Yanagi et al. | 370/60 |
| 5,365,519 | 11/1994 | Kozaki et al. | 370/60 |
| 5,379,297 | 1/1995 | Glover et al. | 370/60.1 |
| 5,602,853 | 2/1997 | Ben-Michael et al. | 370/474 |
| 5,604,743 | 2/1997 | Le Guigner et al. | 370/474 |
| 5,610,921 | 3/1997 | Christensen | 370/474 |
| 5,625,625 | 4/1997 | Oskouy et al. | 570/474 |

*Primary Examiner*—Chau Nguyen
*Attorney, Agent, or Firm*—William C. Cray; Susie H. Oh

[57] ABSTRACT

A header and a payload in a cell are separated for transfer between a cell interface and a host memory. The header is transferred to a control memory. For transfer to the host memory, the control memory initially provides a host-memory region address and the region length. The payload is recorded in such region. The control memory also provides a second host-memory region address, and length, when the payload length exceeds the payload length in the first address region. For transfer from the host memory to the cell interface, the control memory provides a host memory region address and the header combines the header and the payload and passes the combination to the cell interface. Cells from different sources (i.e. terminals) are scheduled at table positions dependent upon their individual transfer rates. The cells at the scheduled positions are normally transferred in time slots corresponding to such positions. When more than one (1) cell is scheduled at the same position, one (1) cell is transferred on a preset priority basis to the corresponding time slot. The other cells are delayed for transfer subsequently in idle time slots (i.e. no cell normally scheduled) in the same or other priorities. The cell delays for each source are accumulated to a maximum preset value. When the cell delays accumulated for a source exceed the normal time spacing between cells from that source, the source transfers a cell in an idle time slot prior to the normally scheduled time slot to compensate for such delay.

37 Claims, 5 Drawing Sheets

CONTROLLER FOR ATM SEGMENTATION AND REASSEMBLY

This is a continuation of application Ser. No. 08/299,068, filed Aug. 31, 1994, abandoned.

This invention relates to telecommunications systems for, and methods of, transferring information through telephone lines. More particularly, this invention relates to systems for, and methods of, transferring information such as digitally encoded television and voice signals efficiently and reliably through telephone lines.

BACKGROUND OF THE INVENTION

Telephone systems in the United States provide central offices for receiving signals from calling telephones within a particular radius such as one (1) to two (2) miles from the central office and for transmitting telephone signals to such telephones. The telephone signals from a calling telephone are then transmitted through long distances from such central office. The telephone signals then pass to the receiving telephone through a central office within a radius of one (1) mile to two (2) miles from such central office.

The telephone signals are transmitted long distance between central offices through optical fibers which have replaced other media previously provided for such purposes. The optical fibers have certain distinctive advantages over the lines previously provided. They allow a significantly increased number of signals from different telephones to be transmitted at the same time through the optical fibers. They pass the digitally-encoded signals with a higher accuracy than other media.

Various systems have been adopted to carry digitally-encoded signals for telephone, video, and data services. One of such systems now being adopted is designated as asynchronous transfer mode (ATM). This system is advantageous because it recognizes that generally signals travel in only one direction at any one time between a calling subscriber and a receiving subscriber. The system preserves bandwidth in the other direction so that a maximum number of different messages can be transmitted in such direction.

In ATM systems, cells are provided to transmit information between access multiplexers or terminals through central offices. Each of the cells contains headers identifying the calling and receiving stations and also contains a payload providing the information being transmitted and received. The cells pass from the calling telephone through the access multiplexers to a first central station. The cells then pass through the first central station and optical fibers to a second central station and then to the receiving access multiplexer. During the transfer of the cells to the central stations, the headers may be changed. These changes in the address indicate the path that the cell is following between each pair of central stations to reach the receiving telephone.

In the prior art, to reassemble cells into signals at the access multiplex, the header and the payload in each cell have been transferred to a control memory that processes the header to determine what path it came from and thus reassemble the signal based upon this path. This has created certain difficulties. For example, it has required the control memory to be relatively large, particularly since the memory receives the header and the payload. It has also caused the transfer to be slow, particularly since the header and the payload have to be processed and the payload is generally twelve times longer than the header.

There are other problems in the operation of the ATM systems of the prior art. These problems have resulted from the fact that access lines and central stations receive cells from a number of different sources. Each source may illustratively constitute a different one of the calling stations and may illustratively have a different rate of transferring cells into successive time slots. For example, one source may transfer cells into an access line in every third (3d) time slot and another source may transfer cells into an access line in every fourth (4th) time slot. In the past, a decision has been made after the transfer of a cell in each time slot as to which source, if any, is to transfer a cell into the next time slot. This system has been cumbersome and slow because the transfer has to be interrupted after the transfer of a cell into each time slot while a decision is being made as to the transfer, if any, in the next time slot.

BRIEF DESCRIPTION OF THE INVENTION

This invention provides apparatus for, and methods of, overcoming the disadvantages discussed in the previous paragraphs as occurring in an ATM system. The apparatus and method of this invention minimize the time for processing the cells to update the headers as the cells are transferred through the telephone lines between the calling telephone and the receiving telephone. The apparatus and method of this invention also minimize the time for introducing the cells into successive time slots in the lines by scheduling in advance the cells to be provided in the successive time slots in the lines.

In one embodiment of the invention, a header and a payload in a cell are separated for transfer between a cell interface and a host memory. The header is transferred to a control memory. For transfer to the host memory, the control memory initially provides a host-memory region address and the region length. The payload is recorded in such address region. The control memory also provides a second host-memory region address, and length, when the payload length exceeds the payload length in the first address region. For transfer from the host memory to the cell interface, the control memory provides a host memory region address and the header combines the header and the payload and passes the combination to the cell interface.

Cells from different sources (i.e. terminals) are scheduled at table positions dependent upon their individual transfer rates. The cells at the scheduled positions are normally transferred in time slots corresponding to such positions. When more than one (1) cell is scheduled at the same position, one (1) cell is transferred on a preset priority basis to the corresponding time slot. The other cells are delayed for transfer subsequently in idle time slots (i.e. no cell normally scheduled) in the same or other priorities.

The cell delays for each source are accumulated to a maximum preset value. When the cell delays accumulated for a source exceed the normal time spacing between cells from that source, a cell from the source transfers a cell in an idle time slot prior to the normally scheduled time slot to compensate for such delay.

DETAILED DESCRIPTION OF THE INVENTION

Figure 1:
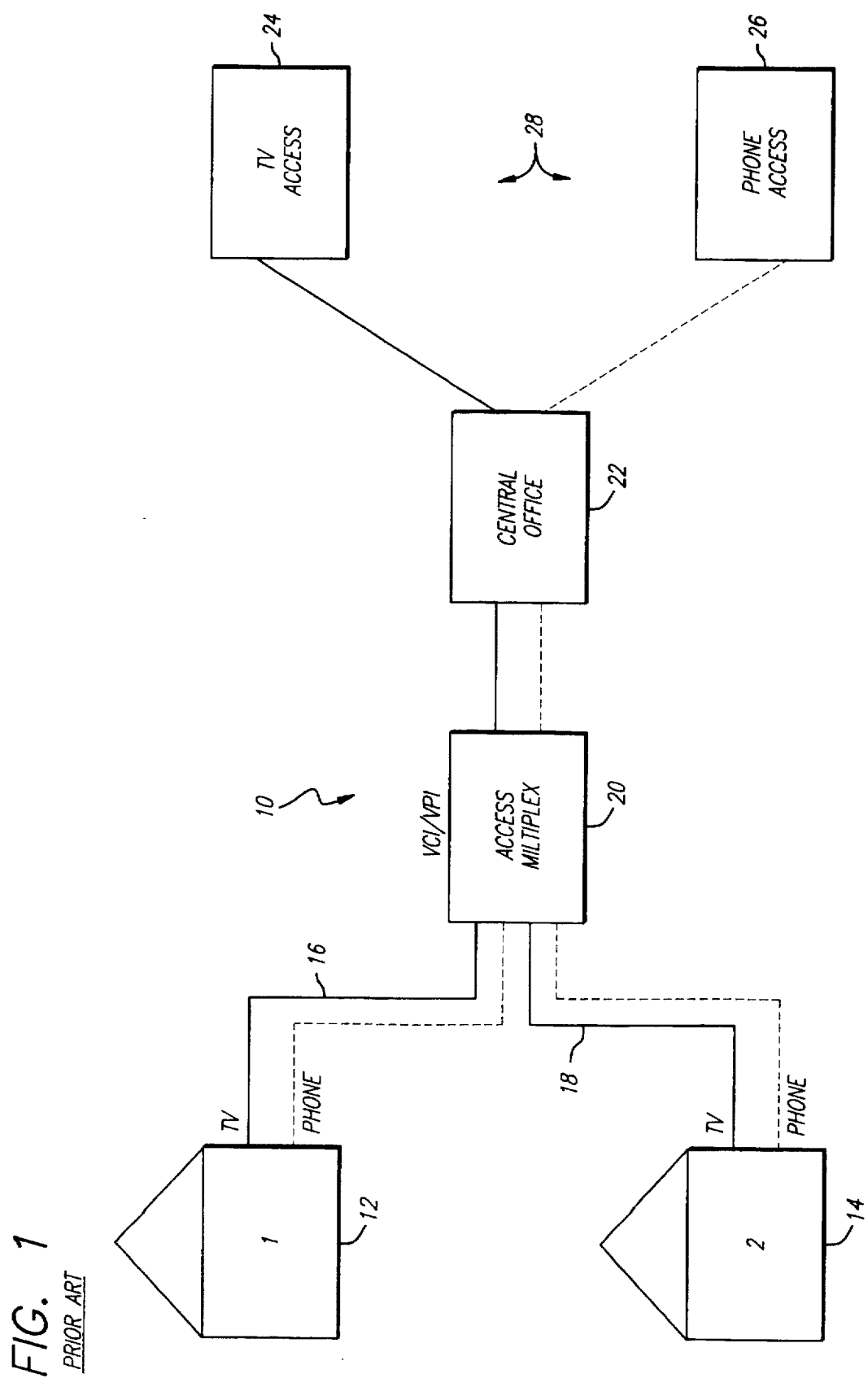
FIG. 1 is a schematic block diagram illustrating on a simplified basis the paths for transferring cells of information in an asynchronous transfer mode between a calling station and a receiving station through an access multiplex.

FIG. 1 illustrates in block form a system generally indicated at 10 and known in the prior art for transferring signals to and from a pair of telephones (or sources) 12 and 14 respectively through lines 16 and 18 to a common access multiplex 20. The telephone (or source) 12 may illustratively transmit or receive television signals and telephone (voice) signals on a line 16 and the telephone (or source) 14 may illustratively transmit or receive television signals and telephone (voice) signals on a line 18. All signals are digitally encoded. For purposes of simplification, the television signals are shown in FIG. 1 as being transferred in solid lines and the telephone signals are shown in FIG. 1 as being transferred in broken lines.

The signals in the lines 16 and 18 pass to the access multiplex 20. The respective digitally-encoded transmit signals are segmented into fixed-length cell payloads and a cell header is added to each cell payload to form a cell. Similarly, received cells are reassembled into the respective receive signals. The headers of the cells are generated in the access multiplex to provide a virtual channel indication and/or a virtual path indication. The header indicates the path which is being followed to pass the cells to a central office 22. The central office 22 may modify the header again in the cells to identify the path through which the cells are subsequently being transferred. The cells may then be transferred either to a television access 24 or to a telephone access 26 at receiving stations generally indicated at 28 in FIG. 1.

Figure 2:
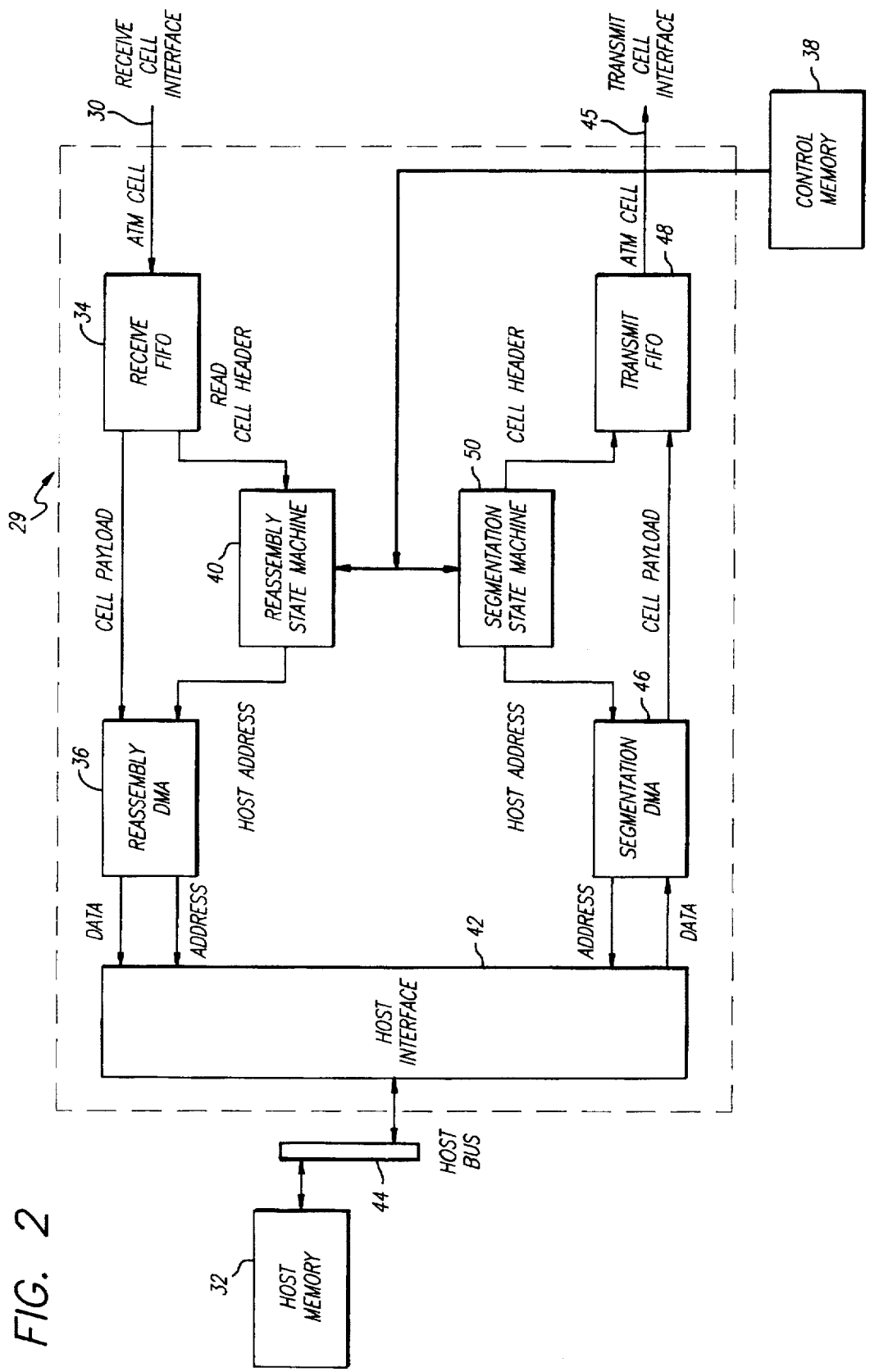
FIG. 2 is a schematic block diagram on a simplified basis of a system included in the system shown in FIG. 1 for transferring cell payloads between a cell interface and a host memory while processing the headers of the cells to control changes in the path of such transfer.

FIG. 2 illustrates one embodiment of a sub-system generally indicated at 29 and enclosed within a box defined by broken lines for use with the access multiplex 20 shown in FIG. 1 for providing a controlled transfer of ATM cell payloads between a line 30 from a receive cell interface and a host memory 32. When the cells are transferred from the line 30, the cells pass through a receive FIFO 34. The FIFO 34 constitutes a first-in-first-out memory well known in the art to provide a time buffer. The payload in each cell then passes to a reassembly direct memory access (DMA) stage 36. The header in each cell passes to a reassembly state machine 40 for processing.

The header in each cell is introduced from the reassembly state machine 40 to a control memory 38 which processes the header to provide addresses that indicate where the cell payloads are to be stored in the host memory 32. The addresses are then applied through the reassembly state machine 40 to the reassembly direct memory access (DMA) stage 36 to direct the payload from the FIFO 34 through a host interface 42 to a host bus 44. The cells are then transferred in the host memory 32 to the addresses indicated by the control memory 38.

Cells may also be transferred to a transmit cell interface through a line 45 by the sub-system 29 shown in FIG. 2. The segmentation state machine 50 reads addresses from the control memory 38 that indicate where cell payloads are stored in the host memory 32. The addresses are then applied by the segmentation state machine 50 to the segmentation direct memory access (DMA) 46 to direct the cell payloads to the transmit FIFO 48. The transmit FIFO 48 may be constructed in a manner similar to the receiver FIFO 34. The header is introduced by the control memory 38 to the segmentation state machine 50 for combination in the transmit FIFO 48 with the payload. The recombined cell then passes to the transmit cell interface line 45.

Figure 3:
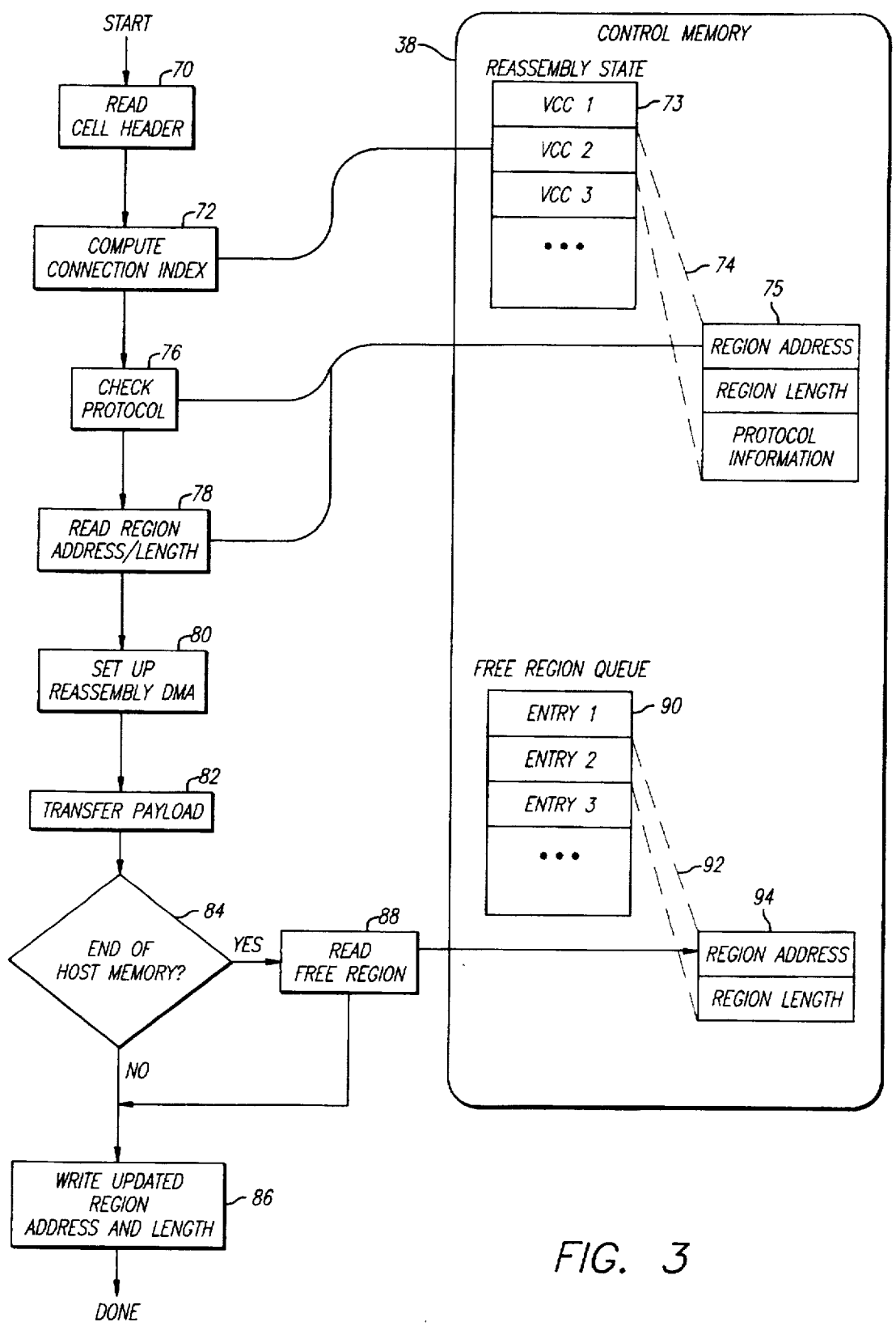
FIG. 3 is a schematic block diagram showing in additional detail the operation of the sub-system shown in FIG. 2 when the cell payloads are transferred from the receive cell interface to the host memory.

FIG. 3 illustrates in additional detail the operation of the sub-system shown in FIG. 2 in separating the header and the payload in a cell, reassembling the cell payloads and recording the reassembled payloads in the host memory 32. In the flow chart shown in FIG. 3, the cell header is initially read as at 70. The header is used to compute a "connection index" (see block 72) to yield a memory address in a reassembly state. This is indicated as a table 73 designated as "Reassembly State" in the control memory 38. The table 73 contains a plurality of virtual channel connections which are respectively designated as "VCC 1", "VCC 2", "VCC 3", etc.

Each of the virtual channel connections contains a table 75 which provides certain information including the address of a region of the host memory 38, the length of the region in the host memory and the protocol information for the virtual channel connection VCC. FIG. 3 schematically shows that the table containing the address region in the host memory 38, the length of the region and the protocol information for the virtual channel connection VCC are being selected from the virtual channel connection designated as "VCC 2". This is indicated by broken lines at 74 and by the table 75 in FIG. 3. It will be appreciated that this is schematic and illustrative and that other VCC's may be selected.

The cell from the line 30 in FIG. 2 relating to the receive cell interface is then checked with the protocol information in the VCC 2 virtual channel connection in the table 75 in the control memory 38 as indicated at 76 in FIG. 3. If the check indicates that the protocol information in the header and the payload is correct, the region address in the host memory 32 and the length of such region are read from the VCC 2 block in the control memory 38 as indicated at 78 in FIG. 3. The region address in the host memory 32 is passed to the reassembly DMA 36 in FIG. 2 as indicated at 80. The reassembly DMA 36 is then activated to transfer the cell payload from the receive FIFO 34 in FIG. 2 to the host memory 32 as indicated at 82 in FIG. 3.

As the successive cell payloads for the VCC 2 table 73 are reassembled in the region, a check is made in each reassembly to determine if the end of the region in the VCC 2 channel connection has been reached. This is indicated at 84 in FIG. 3. If the answer is "No", the region address for successive cells is incremented for the successive payloads in the VCC 2 channel connection recorded in the host memory region and the region length is decremented by the same amount. A block 86 in FIG. 3 indicates this.

If the end of the region in the VCC 2 table in the control memory 38 has been reached, a "Yes" indication is provided from the block 84. This causes a block 88 to be activated in FIG. 3. This block is designated as "Read Free Region". The control memory 38 contains a Free Region Queue indicated at 90 in FIG. 3. When the block 88 is activated, it causes the next entry in the Free Region Queue 90 to be selected. For example, when entry 1 in the free region queue has been previously selected, entry 2 in the Free Region Queue 90 is now selected. This is indicated by broken lines 92 extending from the entry 2 in the Free Region Queue 90 to a table 94 in FIG. 3.

Entry 2 in the Free Region Queue contains a new address region in the host memory 38 and the length of such region. This information is transferred to the table 75 in place of the information previously recorded in the table. The blocks 78, 80, 82, 84, 86 and 88 are now operated as discussed above to transfer the payloads in the cells on the line 30 to the regions in the host memory 32. At the end of this region, entry 3 in the Free Region Queue may be selected to provide a new address region in the host memory 32 and the length of such region if the payload has not been completely recorded in the host memory 32. The steps described above are repeated in this manner until all of the payload has been recorded in the host memory 32.

Figure 4:
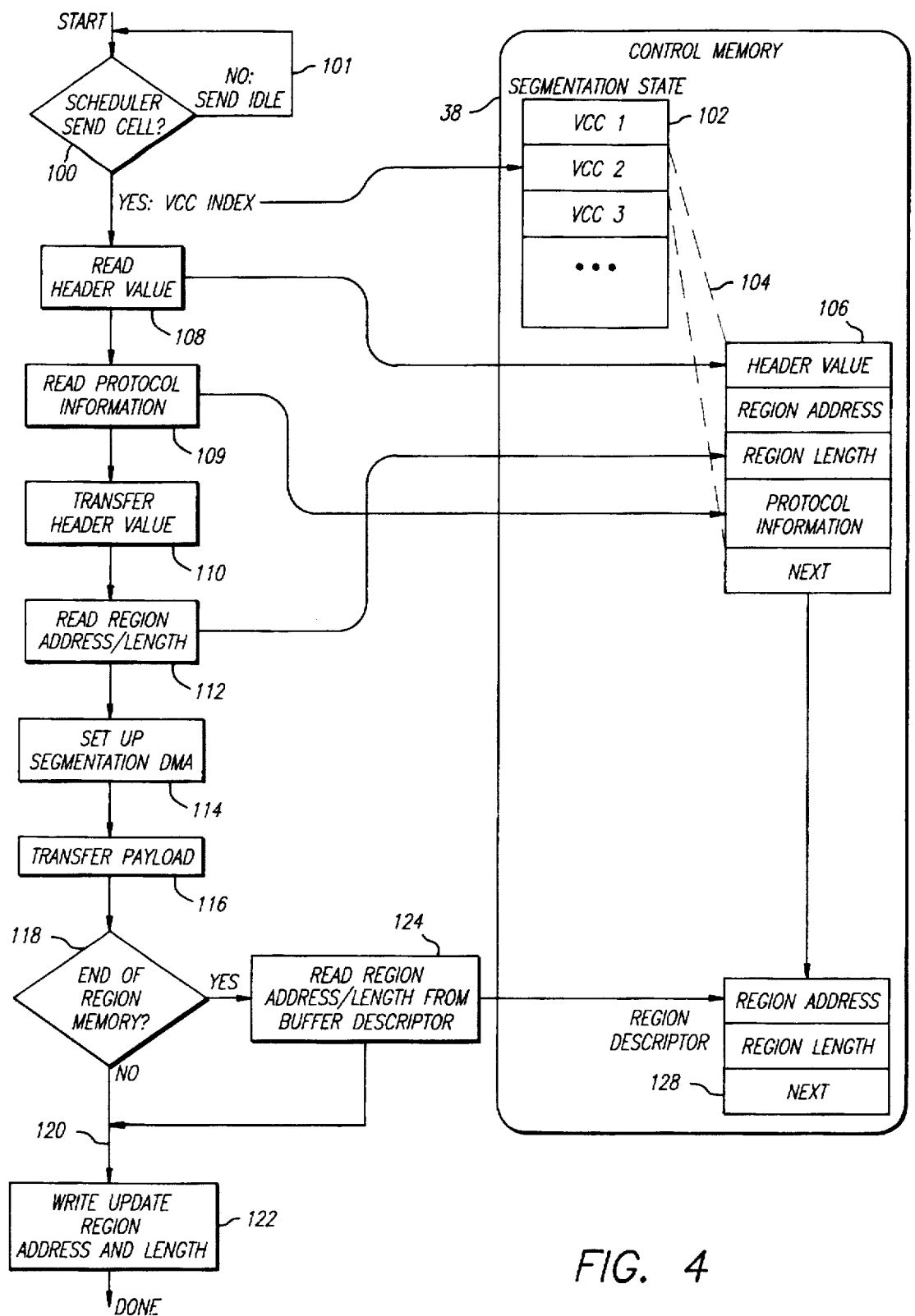
FIG. 4 is a schematic block diagram showing in additional detail the operation of the sub-system shown in FIG. 2 when the cell payloads are transferred from the host memory to the transmit cell interface.

FIG. 4 indicates in additional detail the the cell payloads from the host memory 32, reading the header from the control memory 38 to indicate the ATM path, combining the header and the payload into a cell and transferring the cell to the line 45. In the flow chart shown in FIG. 4, a block 100 is provided to determine if a VCC cell has been scheduled for a particular time slot. If a cell has not been scheduled, an idle cell (i.e. no cell recorded in a time slot) is transferred to the line 45 in FIG. 2. This is indicated by a line 101 in FIG. 4.

If a cell has been scheduled for the particular time slot, the block 100 in FIG. 4 selects a virtual channel connection in a table 102 in the control memory 38. This table is designated as "Segmentation State" in FIG. 4. As shown in FIG. 4, the table 102 contains a plurality of virtual channel connections which are illustratively designated as "VCC 1", "VCC 2", "VCC 3", etc. The virtual channel connection VCC 2 is illustratively shown as being selected in the table 102. This is indicated by broken lines 104. It will be appreciated that any other block could have been chosen. The virtual channel connection VCC 2 illustratively includes a header value (to indicate the path of transfer of the cell), a region address, a region length, protocol information and the position of the next region description in the host memory. This is illustrated at 106 in FIG. 2.

The header value and the protocol information in the VCC 2 block are read from the control memory 38 as indicated at 108 and 109 respectively in FIG. 4. The header value is then transferred to the transmit FIFO 48 in FIG. 2 as indicated at 110 in FIG. 4 and the region address and length are read from the VCC 2 virtual channel connection as indicated at 112 in FIG. 4. The segmentation DMA 46 in FIG. 2 is then set up (see block 114 in FIG. 4) and the payload is transferred from the host memory region to the transmit FIFO 48 in FIG. 2 (see block 116 in FIG. 4). A check is made in each transfer of the payload of successive cell to determine if the region being transferred for the virtual channel connection 106 is at the end of its length. This is indicated at 118 in FIG. 4.

If the end of the host region in the VCC 2 virtual channel connection has not been reached as indicated at 120 in FIG. 4, the region address at 106 in the control memory is incremented to account for the successive payload transferred to the transmit FIFO 48 and the region length is decremented by the same amount (see block 122). This provides an updated record of the region being processed in the virtual channel connection VCC 2 and an updated record of the remaining length of the region to be processed in the virtual channel connection VCC 2.

When the end of the region in the virtual channel connection VCC 2 has been reached, the address of the next region in the host memory 38 and the length of this region are read as indicated at 124. This next region is indicated as "Next" in the table 106 and is indicated in additional detail by a table 128 in FIG. 4. The table 128 is designated as a "Region Descriptor" to conform to the designation in the block 124. The table 128 also contains a block designated as "Next". The table 128 is then transferred to the position of the table 106 to replace the information previously in the table 106. The address information transferred from the table 128 to the table 106 is then processed in the blocks 108, 109, 110, 112, 114, 116, 118, 120, 122 and 124 in the same manner as described above. Upon the completion of the processing of the region in the table 106, the "Next" block in the table 106 is processed to determine the subsequent host address region in the host memory 32 and the length of this address region.

Figure 5:
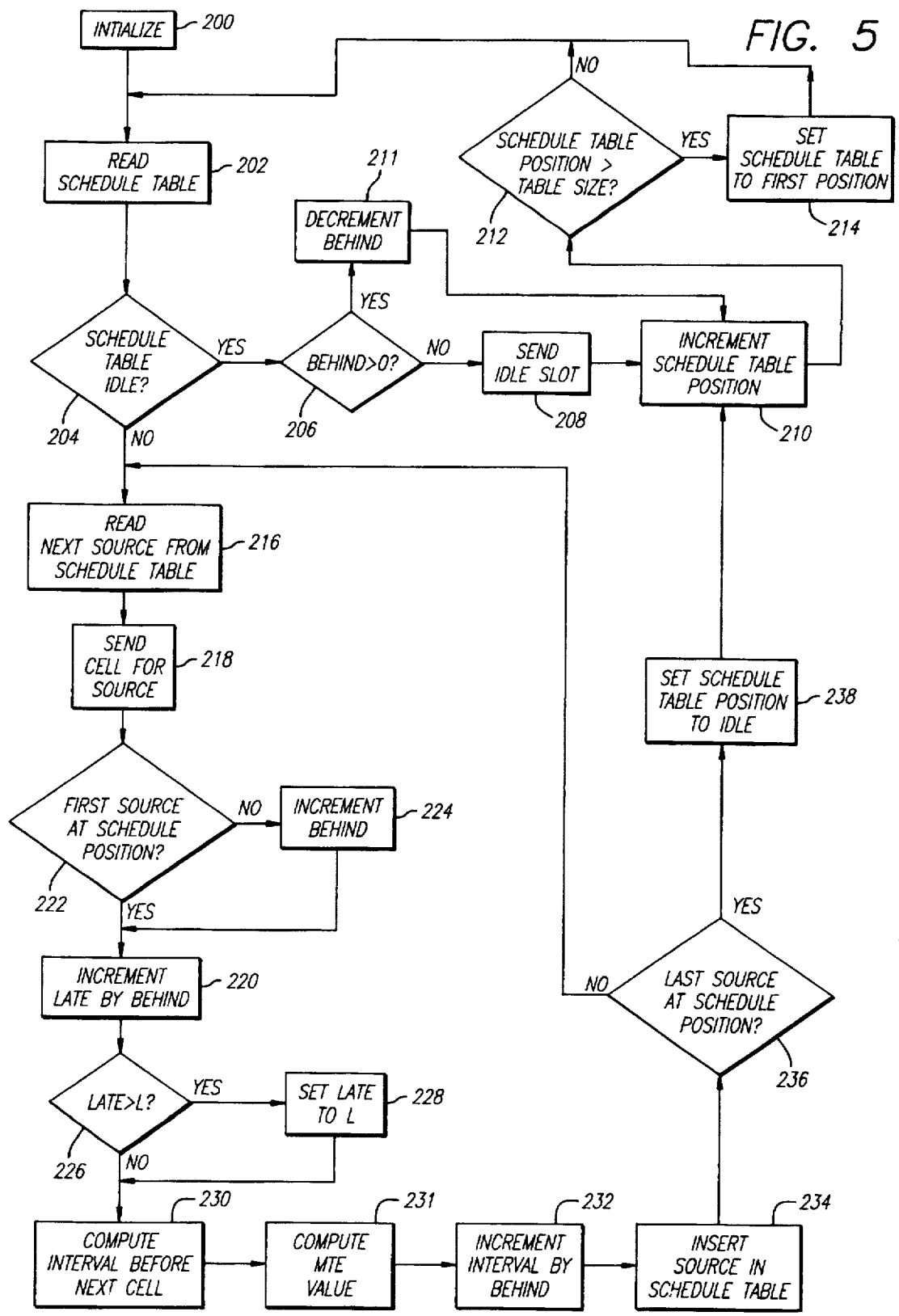
FIG. 5 is a schematic block diagram showing a sub-system for scheduling in advance a transfer of cell payloads from a plurality of sources to successive positions in a schedule table for subsequent transfer to successive time slots in an order corresponding to the scheduling of the cells in the successive positions in the schedule table.

FIG. 5 schematically illustrates a flow chart involving a system for, and method of, scheduling cells from different sources (e.g. telephones such as the telephones 12 and 14 in FIG. 1) for transfer in successive time slots in accordance with an individual rate for each of such different sources. As a first step in such flow chart, the parameters of the system and method are initialized. This is illustrated at 200 in FIG. 5.

Initialization includes the following steps:

1. The "late" state of each source (or telephone) is set to a value of zero (0) from a time standpoint. This means that none of the sources is initially late in transferring a cell from that source to one of a plurality of time slots.

2. A schedule formed from a plurality of successive positions is set to "Idle". This means that there is no source information in any of the positions in the schedule table.

3. The rate I of transferring cells from each source to the transmit cell interface 45 is scheduled at an individual value for each source. For example, a first source may be scheduled to transfer a cell in every third (3rd) position in the schedule table. This means that the rate I for the first source is three (3). Similarly, the rate I for a second source may be set to four (4) to indicate that a cell from that source is scheduled to be transferred to a position in the schedule table once in every four (4) positions.

5. The parameter L is individually set for each of the different sources. The parameter L for a source indicates the maximum value of the "late" state for that source. A source can be late by a value greater than L relative to the time that a cell from the source should be transferred in a time slot in accordance with the rate I for that source. However, the "late" value for the source is limited to L. For example, the maximum "late" value L for the first source may be twenty (20) time slots and the maximum late value L for the second source may be thirty (30) time slots.

6. The position in the schedule table is set to the first entry in that table.

7. The "behind" state is set to zero (0). The "behind" state indicates the number of cell slots that the schedule table is late relative to the intended time slots.

As previously described, the transfer of cells from a source according to its position in the schedule table is scheduled ahead of the time that such position is presented in the schedule table. After the schedule table has been initialized as described above, the current schedule table position is read as indicated at 202 in FIG. 5. It may sometimes happen that no cell is scheduled to be transferred at a particular position in the schedule table. This preferably occurs at times during the transfer sequence because the number of time slots during the transfer sequence should exceed the number of cells to be transferred from the different sources during such transfer sequence. In this way, all of the cells from the different sources will be almost certainly transferred in such transfer sequence.

When a position in the schedule table is idle as determined at 204 and as indicated as "Yes" to the right of the block 204, a determination is made (see block 206) whether the schedule table is late (or behind) relative to the intended time slots in the schedule table normally scheduled for such sources. If the schedule table is not late (or behind) in scheduling in a particular position in the schedule table and if no cell is normally scheduled at that position, a time slot corresponding to such position is filled with an idle cell. This is indicated at 208 in FIG. 5. Even though no cell payload is scheduled to be transferred in the particular position in the schedule table and an idle cell is actually transferred in the corresponding time slot, the schedule table is advanced or incremented to the next position as indicated at 210 in FIG. 5.

If the schedule table is late (or behind) relative to the intended time slots and there is an idle time slot as discussed above, the value of the "behind" state is decremented and no idle cell is transferred. This is indicated at 211 in FIG. 4. The schedule table is advanced to the next position as above as indicated at 210.

The schedule table has a limited number of positions. When an advance or incrementation has been made to the last position in the schedule table, the schedule table is returned to its initial position and a new advance is then made through the successive positions in the schedule table. A determination is made at 212 as to whether the last position in the schedule table has been reached. If the answer is no, the schedule table is read as indicated at 202 and as described above. If the answer is yes, the schedule table is returned to the first position (see block 214) and the schedule table is read as indicated at 202.

When the position being processed in the schedule table is not idle, the next source is read from the schedule table. This is the source scheduled to provide a cell at that position in the schedule table. The reading of the next source from the schedule table is indicated at 216 in FIG. 5. This cell is transferred to the time slot corresponding to such position as indicated at 218 in FIG. 5.

It may sometimes happen that cells from more than one (1) source may be scheduled for a particular position in the schedule table in accordance with the rates of transfer of cells from such different sources. Only the cell from one (1) source can be transferred into the time slot corresponding to such particular schedule position. The cells from the other sources scheduled at that particular table position are then delayed to subsequent time slots. This delay may occur for each of the different sources scheduled for the same schedule position in any different number of priorities which are well known in the art for other purposes than the purposes of this invention. For example, a simple priority may be on the basis of the relative times at which the sources have scheduled cells for the same position in the schedule table.

When a cell from a source is delayed in the manner discussed above to a subsequent time slot, the value of the behind state is incremented. This process is indicated at 222 and 224. If the schedule table is behind when a source has transferred a cell, the late value for the source is incremented in the number of time slots that the schedule table is behind as indicated at 220 in FIG. 5.

Every time that an increment occurs in the number of time slots that the transfer of a cell from a particular source is late or behind, a determination is made as to whether the count has exceeded the maximum value of L for that particular source. This is indicated at 226 in FIG. 5. If the maximum value L has been reached for that particular source, the late count for that particular source is maintained at L. (See 228 in FIG. 5). If the maximum count L has not been reached for that particular source, an advance is made from the block 226 to a block 230.

The block 230 determines the number of time slots before the next cell for the particular source block would normally be presented. This number is designated as "Interval" in FIG. 5. As shown in FIG. 5, $$\text{Interval}=\text{I}-\text{Late} \tag{1}$$

For example, if I ten (10) for the particular source and if the transfer of a cell from that source into a time slot is late by seven (7) time slots, the Interval=10−7=three (3) time slots. This indicates that the next cell from the particular source should be scheduled for transfer three (3) time slots later.

Because the value of I is not necessarily an integral number of cell slots, the interval value computed at 230 may not be an integral number. The value used to schedule the source (the "schedule interval") into the schedule table will be the interval value computed at 230 and increased to the nearest integral number of cell slots. The "schedule value" will also be increased to a value of one (1) if less than zero as a source cannot be scheduled into the past. The new "late" value for the source is the "schedule interval" minus the desired interval computed in 230. These computations are indicated at 231.

If the schedule table is "behind" relative to the intended time slots, then future schedule table positions may not generate a transmit time slot as indicated by 211 and 210. The "schedule interval" is incremented by the number of time slots that the schedule table is behind to account for this possibility as indicated at 232.

The source is inserted into the schedule table at a time slot in accordance with the "schedule interval" in the discussion above. (See block 234 in FIG. 5). A determination is then made as to whether such insertion has occurred from the last source scheduled at the current position in the schedule table. This is indicated at block 236 in FIG. 5. If the answer is no, the next source scheduled at the schedule table is read as indicated at 216 in FIG. 5. This source is then processed through the blocks 218–234 (even numbers only) in the manner described above. If the answer is yes, the position at the schedule table is set to idle as indicated at 238 in FIG. 5 and the position at the schedule table is incremented as indicated at 210 in FIG. 5.

This invention provides certain advantages over the prior art. It separates the header and the payload in each cell, processes the header and reassembles the payload directly to the host memory 32 in FIG. 2. This provides a faster response time than in the prior art since only the header in each cell has to be processed and no time is lost in processing the payload in such cell as in the prior art. This saving in time can be significant since the payload in each cell is considerably longer than the header in such cell.

The invention is also advantageous in providing a control memory for processing the header, since only the header is processed in the control memory 38, the control memory can be considerably smaller, and can be significantly less costly, than in the prior art since, in the prior art, the control memory has had to have sufficient capacity and speed to process the header and the payload.

When the cells are being transferred through the line 30 from the receive cell interface to the host memory 32, the control memory 38 processes the header to identify information relating to the region in the host memory 32 where the payload is to be stored. When the cells are being transferred from the host memory 32 to the transmit cell interface, the headers are read from the control memory 38 to provide an ATM address. This header can then be combined with the payload and the cell containing the combined header and payload can be transferred to the line 45.

The invention also has other advantages. It schedules cells at successive positions in a schedule table in advance of the time when such cells are to be transferred to time slots from such successive positions in the schedule table. By scheduling such cells in advance of the transfer of the cells to the time slots, no time is lost as in the prior art in determining where and when to transfer each cell after the transfer of the previous cell in the sequence.

The scheduling discussed in the previous paragraph also has other advantages. When cells from more than one (1) source are scheduled at a particular position in the schedule table, the invention provides for the transfer of one (1) of the cells to the time slot corresponding to the scheduled position. The invention then provides for the sequential transfer, to subsequent time slots which would otherwise be idle, of the other cells scheduled at the particular table position.

The invention also determines at each instant the number of time slots in which the transfer of cells from each source is late. The invention additionally provides for the transfer of cells, from sources in which the cells are late, into otherwise idle time slots to reduce thereafter the number of time slots in which the cells from such source are late. In this way, the invention is able to provide an efficient operation in transferring cells from a number of different sources into successive time slots at different rates.

In providing additional transfers of cells that are late, the invention also limits the number of cells that can be transferred as "late". This will prevent the sources from violating certain important traffic parameters in ATM networks.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

We claim:

1. In combination for transferring in an asynchronous transfer mode a cell which has a header providing addresses and has a payload providing data, host memory means having a plurality of different addresses for receiving and storing the payload in the cell, means for receiving the cell, separating and transferring means for separating and transferring the header in the cell, means for separating and transferring the payload in the cell, control memory means responsive to the transferred header for providing a region address identifying addresses in the host memory means where the separated payload is to be transferred, and payload transfer means responsive to the separated payload for transferring the separated payload to the addresses identified in the host memory means by the region address in the control memory means.

2. In a combination as set forth in claim 1, means for indicating the address receiving the payload at each instant in the host memory means, means for determining, upon each transfer of the cell payload to one of the addresses identified in the host memory means by the selected region address in the control host memory means, if such transfer has been made to all of the addresses identified in the host memory means by the region address in the host memory means, means responsive to the transfer of the payload to all of the addresses identified in the host memory means by the selected region address in the control memory means for providing for the selection of a different region address in the control memory means for the transfer of the payload to the host memory means, the different region address identifying a number of addresses in the host memory means different from the addresses identified in the host memory means by the selected region address in the control memory means.

3. In a combination as set forth in claim 2, means for transferring the cell payload to each individual one of the different addresses identified in the host memory means by the selected region address in the control memory means upon each transfer of the payload to a previous one of the addresses identified in the host memory means by the selected region address in the control memory means.

4. In a combination as set forth in claim 1, means for updating the region address in the control memory means upon each transfer of the cell payload to one of the addresses in the host memory means, and means for transferring the payload to each successive one of the different addresses identified in the host memory means by the selected region address in the control memory means upon each transfer of the payload to a previous one of the different addresses identified in the host memory means by the selected region address in the control memory means.

5. In combination for providing in an asynchronous transfer mode a cell which has a header providing addresses and has a payload providing data, control memory means providing a first region address, host memory means having a plurality of addresses for receiving, storing and transferring the cell payload, host interface means, state machine means responsive to the cell for separating the payload in the cell and the header in the cell, the control memory means being responsive to the cell header for providing for the transfer of the cell payload from the individual one of the addresses identified in the host memory means by the first region address in the control memory means and the host interface means to the other one of the addresses identified in the host memory means by the first region address in the control memory means and the host interface means, and payload transfer means for transferring the cell payload from the individual one of the addresses identified in the host memory means by the first region address in the host memory means and the host interface means to the other one of the addresses identified in the host memory means by the first region address in the host memory means and the host interface means.

6. In a combination as set forth in claim 5, means for determining at each instant whether the transfer of the cell payload from the individual one of the addresses identified in the host memory means by the first region address in the control memory means and the host interface means is at the last of the addresses identified in the host memory means by the first region address in the control memory means, and the control memory means being responsive to the transfer of the cell payload at the last of the addresses identified in the host memory means by the first region address in the control memory means for selecting in the control memory means a second region address identifying a number of additional addresses in the host memory means for the continued transfer of the cell payload from the individual one of the additional addresses identified in the host memory means by the second region address in the control memory means and the cell interface means to the other one of the additional addresses identified in the host memory means by the second region address in the control memory means and the host interface means, the additional addresses identified in the host memory means by the second region address in the host memory means being different from the addresses identified in the host memory means by the first region address in the control memory means.

7. In a combination as set forth in claim 5, means disposed between the state machine means and the host interface means for providing a time buffer between the state machine means and the host interface means.

8. In a combination as set forth in claim 5, means disposed between the payload transfer means and the host interface means for providing a time buffer between the payload transfer means and the host interface means.

9. In combination for providing in an asynchronous transfer mode a cell having a header providing addresses and having a payload providing data, host memory means having a plurality of different addresses for receiving, storing and transferring the payload in the cell, host interface means, means for transferring the cell payload from an individual one of the host memory means and the host interface means to the other one of the host memory means and the host interface means, a state machine for separating the cell header and the cell payload, control memory means responsive to the header from the state machine for modifying the header in accordance with the direction of the transfer of the cell from the individual one of the host memory means and the host interface means to the other one of the host memory means and the host interface means, and means responsive to the modified header from the control memory means for transferring the payload from the individual one of the host memory means and the host interface means to the other one of the host memory means and the host interface means in accordance with the modified header.

10. In a combination as set forth in claim 9, the control memory means indicating a first region address in the host memory means, the first region address identifying a number of the different addresses in the plurality in the host memory means, and means for indicating if the last of the addresses identified in the host memory means by the first region address in the control memory means has been reached upon each transfer of the payload between the addresses identified in the host memory means by the first region address in the control memory means and the host interface means and the other one of the addresses identified in the host memory means by the first region address in the control memory means and the host interface means, the control memory means being operative to provide a second region address identifying addresses in the host memory means when the transfer of the payload from the addresses identified in the host memory means by the individual one of the first region address in the host memory means and the cell interface means to the other one of the addresses identified in the host memory means by the first region address in the host memory means and the host interface means has reached the last of the addresses identified in the host memory means by the first region address in the control memory means, the second region address identifying a number of addresses in the host memory means different from the addresses identified in the host memory means by the first region address in the control memory means.

11. In a combination as set forth in claim 9, means for providing a timing buffer between the host memory means and the host interface means.

12. In a combination as set forth in claim 9, the control memory means being operative to provide the first region address in the header when the cell payload is being transferred from the host interface means to the addresses identified in the host memory means by the first region address in the control memory means and to provide the second region address in the header when the cell payload is being transferred from the host interface means to the addresses identified in the host memory means by the second region address in the control memory means.

13. In a combination as set forth in claim 9, the control memory means being operative to include the region address in the header when the payload is being transferred from the host memory means to the host interface means.

14. In combination for providing in an asynchronous transfer mode a cell which has a header providing addresses and has a payload providing data, host memory means having a plurality of addresses for receiving, storing and transferring the payload in the cell, host interface means, means for providing the cell payload at the host interface means, a state machine for separating the cell header and the cell payload, control memory means responsive to the cell header from the state machine for modifying the cell header to indicate a region address in which the cell payload is to be recorded in the host memory means, the region address including a number of the different addresses in the host memory means, and means for transferring the payload to the addresses identified in the host memory means by the region address in the control memory means in accordance with the modified cell header.

15. In a combination as set forth in claim 14, the region address in the control memory means constituting a first region address, the number of the addresses identified in the host memory means by the first region address in the host memory means being insufficient to store the cell payload, means for indicating if the last of the addresses identified in the host memory means by the first region address in the control memory means has been reached upon each transfer of the cell payload to one of such addresses in the host memory means, and the control memory means being operative to indicate a second region address in the host memory means for the transfer of the cell payload upon the transfer of the cell payload to all of the addresses identified in the host memory means by the first region address in the control memory means, the addresses identified in the host memory means by the second region address being different from the addresses identified in the host memory means by the first region address in the control memory means.

16. In a combination as set forth in claim 15, means for providing a timing buffer between the host memory means and the host interface means.

17. In a method of providing in an asynchronous transfer mode a cell having a header providing addresses and having a payload providing data, the steps of:

providing host interface means, providing a host memory having a plurality of addresses for receiving, storing and transferring the cell payload, separating the cell header and the cell payload, providing a control memory, modifying the cell header in the control memory in accordance with the direction of transfer of the cell from the individual one of the host interface means and the host memory to the other one of the host interface means and the host memory, and transferring the cell payload from the individual one of the host interface means and the host memory to the other one of the host interface means and the host memory in accordance with the modified header.

18. In a method as set forth in claim 17 wherein the control memory has a first region address and wherein the first region address identifies a number of the addresses in the host memory and wherein an indication is provided upon each transfer of the cell payload from the individual one of the host interface means and the addresses identified in the host memory by the first region address in the control memory to the other one of the host interface means and the addresses identified in the host memory by the first region address in the control memory whether the transfer of the cell payload between the individual one of the host interface means and all of the addresses identified in the host memory by the first region address in the control memory has been made and wherein the host memory has addresses identified by a second region address in the control memory and wherein the second region address in the control memory identifies a number of addresses other than the addresses identified in the host memory by the first region address in the control memory and wherein the cell header is modified in accordance with the second region address in the host memory after the transfer of the cell payload involving all of the addresses identified in the host memory by the first region address in the control memory has been made.

19. In a method as set forth in claim 17, including the step of:

providing a time buffer between the host interface and the host memory.

20. In a method as set forth in claim 17 wherein a determination is made, upon each transfer of the cell payload to the individual one of the host interface means and the addresses in the host memory, as to whether the transfer has been made between the host interface means and all of the addresses identified in the host memory by the first region address in the control memory, and wherein a transfer is then made of the cell payload between one of the host interface means and the addresses, previously not receiving a transfer, identified in the host memory by the first region address in the control memory when the transfer of the payload has not been made between the host interface means and all of the addresses identified in the host memory by the first region address in the control memory and wherein a second region address is provided in the control memory to identify a number of the addresses in the host memory other than the addresses identified in the host memory by the first region address in the control memory and wherein a transfer is then made of the cell payload between the host interface means and the addresses identified in the host memory by the second region address in the control memory when the transfer has been made of the cell payload between the host interface means and all of the addresses identified in the host memory by the first region address in the control memory.

21. In combination for providing in an asynchronous transfer mode a cell having a header providing addresses and having a payload providing data, a host memory having a plurality of different addresses for receiving, storing and transferring the cell payload, FIFO means for providing a transfer of the cell payload, a control memory for providing a region address indicating a number of the different addresses in the host memory and for storing the cell header, and state machine means for providing for the transfer of the cell payload between an individual one of the different region addresses identified in the host memory and the FIFO means, the region address in the control memory constituting a first region address and the control memory providing a second region address indicating a number of addresses in the host memory, the addresses identified in the host memory by the second region address in the control memory being different from the addresses identified in the host memory by the first region address in the control memory, and the state machine means providing for the transfer of the payload between the addresses identified in the host memory by the second region address in the control memory and the FIFO means in accordance with the second region address in the control memory when the payload has been transferred between all of the addresses identified in the host memory by the first region address in the control memory and the FIFO means.

22. In combination for providing in an asynchronous transfer mode a cell having a header providing addresses and having a payload providing data, a host memory having a plurality of different addresses for receiving, storing and transferring the cell payload, FIFO means for providing a transfer of the cell payload, a control memory for providing a region address indicating a number of the different addresses in the host memory and for storing the cell header, and state machine means for providing for the transfer of the cell payload between an individual one of the different region addresses identified in the host memory and the FIFO means, the region address in the control memory constituting a first region address and the control memory provid a second region address identifying a number of addresses in the host memory, the addresses identified in the host memory by the second region address in the control memory being different from the addresses identified in the host memory by the first region address in the control memory, and the state machine means providing a selection between the cell header and the addresses identified in the host memory by the second region address in the control memory to receive the payload when the FIFO means has combined the cell payload and the selected one of the header in the cell and the addresses identified in the host memory by the first region address in the control memory and the FIFO means combining the cell payload and the selected one of the cell header and the addresses identified in the host memory by the second region address in the control memory when the FIFO means has combined the cell payload and the selected one of the cell header and the addresses identified in the host memory by the first region address in the control memory.

23. In a method of providing in an asynchronous transfer mode a cell having a header providing addresses and having a payload providing data, the steps of:

providing a host memory having a plurality of different addresses for receiving, storing and transferring the cell payload, providing a control memory for storing the cell header and a region address in the control memory for the cell payload, the region address identifying a number of different addresses in the host memory, providing for the storage in FIFO means of the cell payload, and transferring the cell payload between the FIFO means and the different addresses identified in the host memory by the region address in the control memory in accordance with a selective one of the region address and the cell header in the control memory, the region address constituting a first region address, storing a second region address in the control memory, the second region address identifying in the host memory a number of addresses different from the addresses identified in the host memory by the first region address, and transferring the cell payload between the number of addresses identified in the host memory by the second region address in the control memory and the FIFO means in accordance with the second region address in the control memory when the payload has been trans-
ferred between the number of the addresses identified in the host memory by the first region address in the control memory and the FIFO means.

24. In a method of providing in an asynchronous transfer mode a cell having a header providing addresses and having a payload providing data, the steps of:

providing a host memory having a plurality of different addresses for receiving, storing and transferring the cell payload, providing a control memory for storing the cell header and a region address in the control memory for the cell payload, the region address identifying a number of different addresses in the host memory, providing for the storage in FIFO means of the cell payload, and transferring the cell payload to the FIFO means from the different addresses identified in the host memory by the region address in the control memory, and combining in the FIFO means the cell payload and the cell header in the control memory.

25. In a method of providing in an asynchronous transfer mode a cell having a header providing addresses and having a payload providing data, the steps of:

providing a host memory having a plurality of different addresses for receiving, storing and transferring the cell payload, providing a control memory for storing the cell header and a region address in the control memory for the cell payload, the region address identifying a number of different addresses in the host memory, providing for the storage in FIFO means of the cell payload, and transferring the cell payload to the FIFO means from the different addresses identified in the host memory by the region address in the control memory in accordance with the region address in the control memory, determining the cell header identified in the control memory, combining in the FIFO means the cell payload and the cell header identified in the control memory, and transferring such combinations of the cell header and the cell payload to a transmit cell interface.

26. In combination for providing in an asynchronous transfer mode a cell having a header providing addresses and having a payload providing data, a host memory having a plurality of different addresses for receiving, storing and transferring the cell payload, a control memory for storing the cell header for the cell payload and for storing the addresses in the host memory for the cell payload, state machine means for providing for a transfer of the cell header in accordance with the addresses stored in the control memory for the addresses for the storage of the cell payload in the host memory and for providing the cell payload, and means for combining the cell header and the cell payload transferred from the host memory.

27. In a combination as set forth in claim 26 wherein the control memory has a first region address and wherein the host memory includes a number of the addresses in the plurality for the first region address from the control memory and wherein the state machine means provides for the transfer of the cell payload from the different addresses identified in the host memory by the first region address in the control memory for combination of the cell payload with the cell header.

28. In a combination as set forth in claim 27 wherein the region address in the control memory is a first region address and wherein the control memory provides a second region address for the addresses in the host memory, the second region address in the control memory including a number of addresses in the host memory different from the addresses identified in the host memory by the first region address in the control memory and including protocol information providing a check of the information in the cell, and wherein the state machine processes the second region address in the control memory to provide for the passage of the cell payload from the addresses identified in the host memory by the second region address in the control memory when the payload has been transferred from all of the addresses identified in the host memory by the first region address in the control memory.

29. In a combination as set forth in claim 26 wherein the control memory provides a region address for a number of the addresses in the host memory and protocol information providing a check of the information in the cell and wherein the state machine means processes the first region address to provide for the passage of the cell payload from the number of the addresses identified in the host memory by the first region address in the host memory for combination of such cell payload with the cell header.

30. In a combination as set forth in claim 26 wherein the region address in the control memory is a first region address and wherein the host memory provides a second number of addresses, different from the addresses provided in the host memory by the first region address in the control memory, identified in a second region address in the control memory and wherein the state machine means provides for the transfer of the cell payload from the second number of addresses identified in the host memory by the second region address in the control memory after the transfer of the cell payload from all of the addresses identified in the host memory by the first region address in the control memory has been completed.

31. In combination for providing in an asynchronous transfer mode a cell having a header providing addresses and having a payload providing data, a host memory having a plurality of different addresses for receiving, storing and transferring the cell payload, FIFO means for providing a transfer of the cell payload, a control memory for providing a region address and an indication of the cell header, the region address indicating a number of addresses in the host memory for the storage of the cell payload, and state machine means for providing for the transfer to the FIFO means of (a) the cell payload from the addresses identified in the host memory by the region address in the control memory and (b) the cell header to obtain a combination in the FIFO means of such cell payload and such cell header the control memory providing a conversion to the cell header from the region address in the control memory, and wherein the FIFO means combining the cell payload and the cell header.

32. In combination for providing in an asynchronous transfer mode a cell having a header providing addresses and having a payload providing data, a host memory having a plurality of different addresses for receiving, storing and transferring the cell payload, FIFO means for providing a transfer of the cell payload, a control memory for providing a region address and an indication of the cell header, the region address indicating a number of addresses in the host memory for the storage of the cell payload, and state machine means for providing for the transfer to the FIFO means of (a) the cell payload from the addresses identified in the host memory by the region address in the control memory and (b) the cell header to obtain a combination in the FIFO means of such cell payload and such cell header, the region address in the control memory constituting a first region address and the control memory providing a second region address indicating a number of addresses in the host memory, the addresses identified in the host memory by the second region address in the control memory being different from the addresses identified in the host memory by the first region address in the control memory, and the state machine means providing for the transfer to the FIFO means of the cell payload from the addresses identified in the host memory by the second region address in the control memory in accordance with the second region address in the control memory when the payload has been transferred to the FIFO means from all of the addresses identified in the host memory by the first region address in the control memory.

33. In combination for providing in an asynchronous transfer mode a cell having a header providing addresses and having a payload providing data, a host memory having a plurality of different addresses for receiving, storing and transferring the cell payload, FIFO means for providing a transfer of the cell payload, a control memory for providing a region address and an indication of the cell header, the region address indicating a number of addresses in the host memory for the storage of the cell payload, and state machine means for providing for the transfer to the FIFO means of (a) the cell payload from the addresses identified in the host memory by the region address in the control memory and (b) the cell header to obtain a combination in the FIFO means of such cell payload and such cell header, the region address constituting a first region address and wherein the control memory providing a second region address identifying a number of addresses in the host memory, the addresses identified in the host memory by the second region address in the control memory being different from the addresses identified in the host memory by the first region address in the control memory, and the state machine means providing a transfer of the cell payload from the addresses identified in the host memory by the second region address in the control memory when the FIFO means has transferred the payload from all of the addresses identified in the host memory by the first region address in the control memory and the FIFO means combining the cell header and the cell payload transferred from the addresses identified in the host memory by the second region address in the control memory.

34. In a method of providing in an asynchronous transfer mode a cell having a header providing addresses and having a payload providing data, the steps of:

providing a host memory having a plurality of different addresses for receiving, storing and transferring the cell payload, providing a control memory for storing the cell header and for storing a region address for the cell payload, the region address identifying a number of different addresses in the host memory, providing FIFO means for transferring the cell payload to the FIFO means from the addresses identified in the host memory by the region address in the control memory, transferring the cell payload to the FIFO means from the addresses identified in the host memory by the region address in the control memory, and combining the cell payload and the cell header.

35. In a method as set forth in claim 34, including the steps of:

the region address constituting a first region address, storing a second region address in the control memory, the second region address identifying in the host memory a number of addresses different from the addresses identified in the host memory by the first region address in the control memory, and transferring the cell payload to the FIFO means from the addresses identified in the host memory by the second region address in the control memory in accordance with the second region address in the control memory when the cell payload has been transferred to the FIFO means from all of the addresses identified in the host memory by the first region address in the control memory.

36. In a method as set forth in claim 34, including the steps of:

transferring the cell header to the FIFO means from the control memory for the payload transferred from the host memory, and combining in the FIFO means the cell payload and the cell header.

37. In a method as set forth in claim 34, including the steps of:

determining in the control memory the cell header in accordance with the addresses identified in the host memory by the region address in the control memory, combining in the FIFO means the cell payload transferred from the host memory and the cell header determined from the control memory, and transferring the cell payload and the cell header to a transmit cell interface.

* * * * *